United States Patent [19]

Takahara et al.

[11] Patent Number: 4,752,941
[45] Date of Patent: Jun. 21, 1988

[54] DIVERSITY RECEIVING SYSTEM OF IN-PHASE COMBINATION TYPE

[75] Inventors: Shigeru Takahara; Masaharu Morisaki, both of Tokyo, Japan

[73] Assignee: NEC Corporation, Tokyo, Japan

[21] Appl. No.: 943,223

[22] Filed: Dec. 18, 1986

[30] Foreign Application Priority Data

Dec. 18, 1985 [JP] Japan .................. 60-284726

[51] Int. Cl.⁴ ............................. H04L 1/02
[52] U.S. Cl. .................. 375/100; 455/139; 375/102
[58] Field of Search ............ 375/38, 40, 100, 102; 455/132, 137, 138, 139, 296; 371/68

[56] References Cited

U.S. PATENT DOCUMENTS 2,951,152  8/1960  Sichak et al. ............... 455/139
2,955,199 10/1960  Mindes ....................... 455/139
4,079,318  3/1978  Kinoshita .................... 455/139
4,384,358  5/1983  Shiki et al. .................. 375/102

FOREIGN PATENT DOCUMENTS 190709 10/1984 Japan .

*Primary Examiner*—Benedict V. Safourek
*Assistant Examiner*—Stephen Chin
*Attorney, Agent, or Firm*—Sughrue, Mion, Zinn, Macpeak & Seas

[57] ABSTRACT

A receiver adapted for in-phase combining of plural received signals includes a phase shift circuit for adjusting the phase of at least one of the received signals. The phase shift circuit is controlled by a phase control circuit which operates in response to variances detected in the gain control voltage of an AGC amplifier which follows the signal combiner of the receiver.

11 Claims, 3 Drawing Sheets

DIVERSITY RECEIVING SYSTEM OF IN-PHASE COMBINATION TYPE

BACKGROUND OF THE INVENTION

The present invention relates to a diversity receiving system applicable to digital microwave communications and, more particularly, to a space diversity receiving system which combines in-phase carrier waves received by a plurality of antennae.

In a microwave communication system, it has been customary to use an in-phase combination type space diversity receiving system in order to reduce the effects of fading and, thereby, to insure reliable communication. To combine received waves in the in-phase state, this type of receiving system includes phase control means which is disposed before a demodulator. The phase control means is made up of a low frequency oscillator, a phase shifter, a phase modulator, an amplitude detector, a synchronous detection circuit, and a control circuit, as described later in detail. The phase modulator functions to modulate the phase of one of two intermediate frequency (IF) signals by using a sinusoidal wave signal (sensing signal) which is supplied from the low frequency oscillator. The phase shifter shifts the phase of the other IF signal while being controlled by a signal which is applied thereto from the control circuit. The outputs of the phase modulator and phase shifter are combined by a combining circuit, or combiner, the resulting wave being outputted via the amplitude detector. The sensing signal, which is detected by the amplitude detector, is subjected to synchronous detection at the synchronous detector to which the output of the low frequency oscillator is coupled. The synchronous detector generates a DC signal having positive and negative polarities and representative of the deviation from an in-phase combination phase. The DC signal is fed via the control circuit to the phase shifter so as to control the same such that in-phase combination is constantly performed. A drawback inherent in such phase control means is the intricacy of construction. Another drawback is that the error rate of received signals is apt to increase since the sensing signal which is applied to the received signal is regarded as an interference component of the received signal. Furthermore, because the phase modulator and phase shifter are located in the route through which the received signal is propagated, they undesirably attenuate the received signal and lower the reliability of the communication line.

An arrangement similar to the phase control means described above is disclosed in U.S. Pat. No. 4,079,318 issued on Mar. 14, 1978.

SUMMARY OF THE INVENTION

It is an object of the present invention to provide an in-phase combination type diversity receiving system which is free from the drawbacks inherent in the prior art system as discussed above.

An in-phase combination type diversity receiving system of the present invention comprises: a local oscillator; a first frequency converter for converting a first signal to an IF signal using the output of the local oscillator; an endless phase shifter for phase-shifting the output of the local oscillator; a second frequency converter for converting a second signal to an IF signal using the output of the endless phase shifter; a combiner for combining the IF signals outputted by the first and second frequency converters; an automatic gain controlled (AGC) IF amplifier for amplifying the output of the combiner; a level detector for detecting an AGC voltage of the IF amplifier, a memory for storing the output of the level detector; a comparator for comparing the output of the level detector which appears when the endless phase shifter is shifted by a predetermined phase amount with the output of the memory, which stores the output of the level detector as it appeared before the shift of the endless phase shifter and, thereby, producing the absolute value of and polarity of the difference between the two outputs; a decision unit for deciding whether the absolute value is greater than a predetermined value; a sign discriminator for, when the absolute value is greater than the predetermined value, discriminating the polarity of the difference; and a phase shifter controller constructed to, when the absolute value is not greater than the predetermined value, phase-shift the endless phase shifter by another predetermined phase amount and, when the absolute value is greater than the predetermined value, to store the output of the level detector and to adjust the endless phase shifter by the predetermined phase amount in the same or the opposite direction in response to the output of the sign discriminator, whereby the first and second signal are combined in the vicinity of in-phase.

DETAILED DESCRIPTION OF THE INVENTION

To facilitate the understanding of the present invention, a brief reference will be made to a prior art in-phase combination diversity receiving system, shown in FIG. 1.

Figure 1:
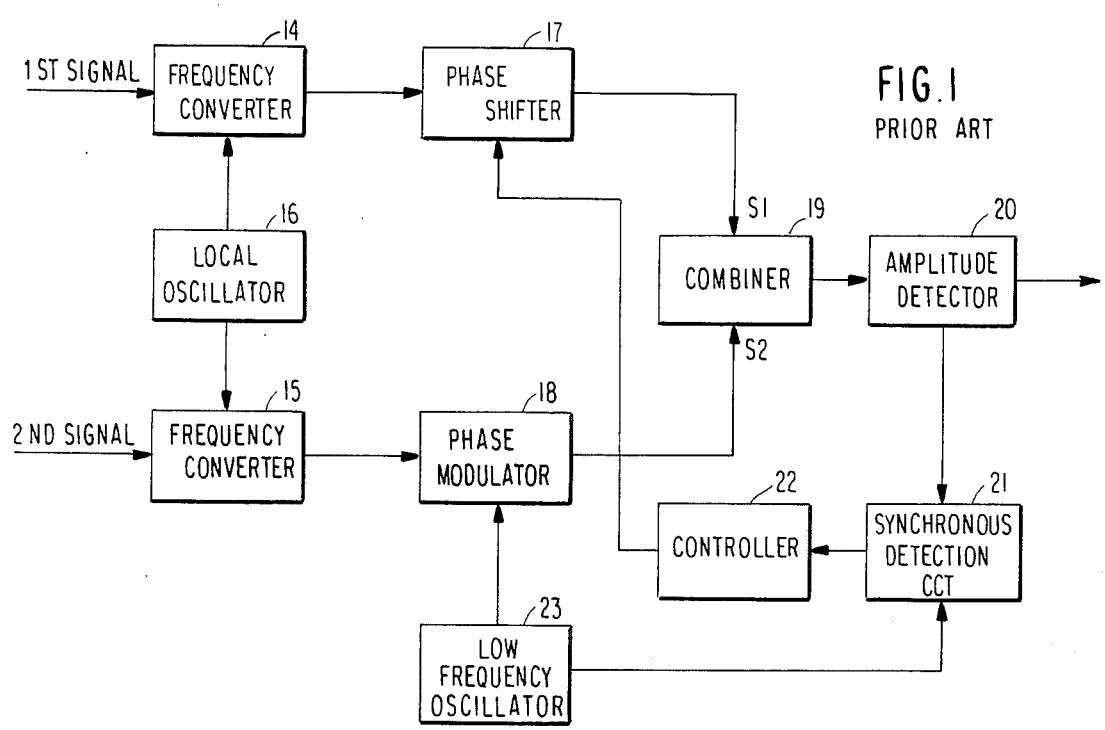
FIG. 1 is a block diagram showing a prior art diversity receiving system of the in-phase combination type.

In FIG. 1, a first signal coming in through a first antenna, not shown, is converted to an IF signal at a frequency converter 14 by the output of a local oscillator 16. A second signal which is received by a second antenna, not shown, is converted to an IF signal at a frequency converter 15 by the output of the local oscillator 16. The IF signal outputted by the frequency converter 14 is applied as a signal $S_1$ to a combiner 19 via a phase shifter 17.

The IF signal appearing on the output of the frequency converter 15, on the other hand, is fed as a signal $S_2$ to the combiner 19 via a phase modulator 18. A composite signal of the signals $S_1$ and $S_2$ is delivered from the combiner 19 by way of an amplitude detector 20. The phase modulator 18 is adapted to modulate the IF of the second signal using a sinusoidal wave signal (sensing signal) which is applied thereto from a low frequency oscillator 23. The amplitude detector 20 detects the sensing signal component, while a synchronous detection circuit 21 to which the sensing signal is fed from oscillator 23 performs synchronous detection on the sensing signal component. The synchronous detection circuit 21 produces a DC signal which assumes either a positive or negative polarity depending upon the deviation of the sensing signal component from the in-phase combination phase of the phase shifter 17. A control circuit 22 drives the phase shifter based on the level and polarity of the DC signal, whereby in-phase combination is accomplished without fail.

Figure 2A:
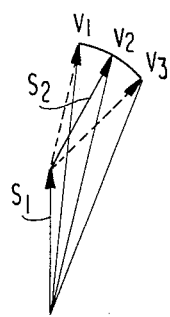
FIGS. 2A to 2C are vector diagrams showing signals produced by combining a signal which is passed through one frequency converter and, then, phase-modulated by a sinusoidal wave signal, and a signal which is passed through the other frequency converter.
Figure 2B:
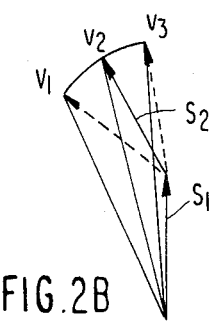
Figure 2C:
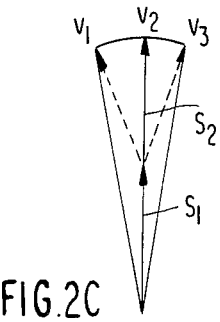

Referring to FIGS. 2A, 2B and 2C, the relationship between the input and the output of the combiner 19, FIG. 1, is shown in vector diagrams. In these diagrams, signal $S_1$ is representative of the signal which is converted to an IF signal by the frequency converter 14 and, then, passed through the phase shifter 17, and signal $S_2$ is representative of the signal which is converted to an IF signal by the frequency converter 15 and, then, passed through the phase modulator 18. Further, $V_2$ is representative of the output of the combiner 19 as produced by combining the signals $S_1$ and $S_2$. This composite vector $V_2$ is assumed to undergo a maximum clockwise swing to $V_3$ or a maximum counterclockwise swing to $V_3$ depending upon the sensing signal.

It will be seen from FIGS. 2A to 2C that the envelope of a combined version of the two signals which have been passed through independent frequency converters contains either a sensing signal component or only a component whose frequency is double the frequency of the sensing signal component, as determined by the phase difference between the two signals. While FIG. 2A shows the case wherein the signal $S_1$ is ahead in phase of the signal $S_2$, FIG. 2B shows the case wherein the signal $S_2$ is ahead in phase of the signal $S_1$. In the former case, a positive DC signal level, for example, appears on the output of the synchronous detection circuit 21 while, in the latter case, a negative DC signal level appears on the same. Further, FIG. 2C shows the case wherein the first and second signals $S_1$ and $S_2$ are combined in the in-phase state, the DC signal level on the output of the circuit 21 becoming zero.

A problem with the prior art diversity receiving system discussed above is that the phase control means (17, 18 and 20 to 23) is extremely complicated in construction. Another problem is that the error rate of received signals is aggravated since a sensing signal is applied to a received signal. In addition, because a phase modulator and a phase shifter are respectively disposed in the received signal channels, the received signals become attenuated and also the reliability of the communication line is limited.

Figure 3:
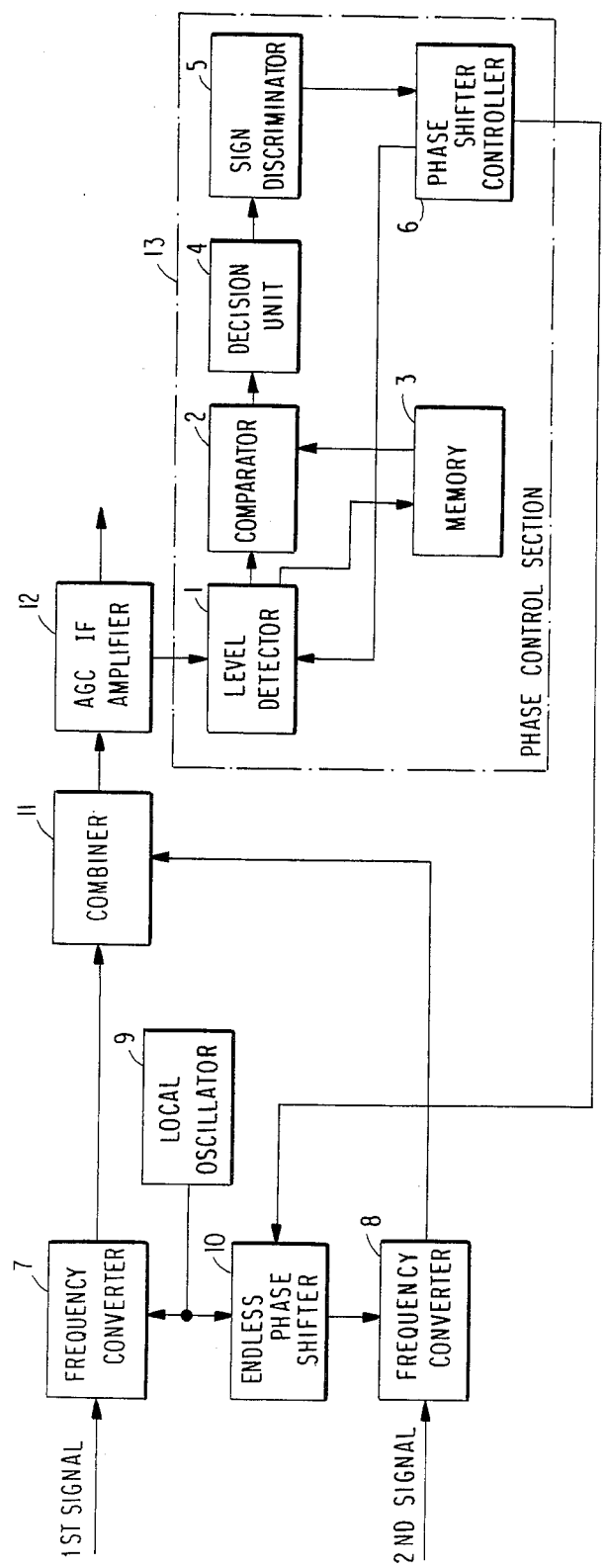
FIG. 3 is a circuit diagram showing an in-phase combination type diversity receiving system in accordance with the present invention.

Referring to FIG. 3, a preferred embodiment of the present invention which successfully eliminates the drawbacks as discussed above is shown. As shown, the output of a local oscillator 9 is applied to a frequency converter 7, and to a frequency converter 8 through an endless phase shifter 10. First and a second signals are converted to IF signals by the frequency converters 7 and 8, respectively. The outputs of the frequency converters 7 and 8 are combined by a combiner 11, then amplified by an automatic gain controlled (AGC) IF amplifier 12, and then outputted. In response to the AGC voltage of the IF amplifier, a phase control section 13 provides a control signal which controls the endless phase shifter 10. The phase control section 13 comprises a level detector 1, a comparator 2, a memory 3, a decision circuit 4, a phase shifter sign discriminator 5 and a controller 6. The endless phase shifter 10 may comprise a 90° hybrid circuit, two AM modulators and a combiner, as disclosed in Japanese Patent Application Publication No. 190709/84.

Figure 4:
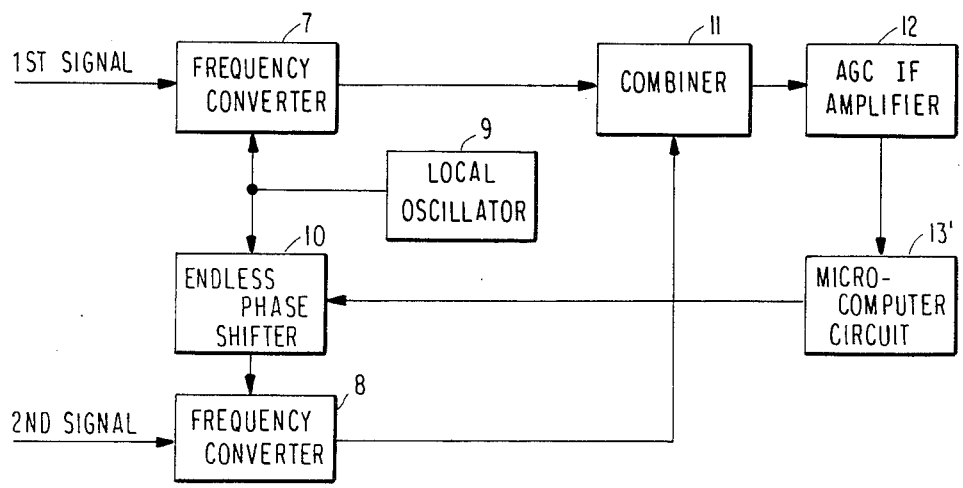
FIG. 4 is a circuit diagram showing an embodiment of the present invention which is implemented with a microcomputer circuit.

It will be seen that the system of the present invention shown in FIG. 3 is simpler in construction than the prior art system of FIG. 1. Specifically, that part of the circuit arrangement of the prior art adapted to detect one of the main signals by applying phase modulation thereto, i.e., the entire section consisting of the phase shifter 17, phase modulator 18, low frequency oscillator 23, synchronous detector 21 and controller 22 is replaced with circuitry which simply comprises a phase control section 13 and the endless phase shifter 10. As shown in FIG. 4, the phase control section 13, unlike the prior art system, can be readily implemented using a microcomputer circuit 13'.

The operation of the phase control section 13 is as follows: The level detector 1 detects the AGC voltage of the AGC IF amplifier 12. The combination level VA thus detected is loaded in the memory 3 after, for example, analog-to-digital conversion. The comparator 2 compares the value VA loaded in the memory 3 in the previous cycle, now denoted as VM, with a digital value which corresponds to the level VA as detected by the detector 1, thereby producing the absolute value A and the polarity of the difference in values. The decision circuit 4 decides whether or not the absolute value A outputted by the comparator 2 is greater than a predetermined reference value P. When the absolute value A is greater (significant) than the reference value P, the sign discriminator 5 discriminates the polarity of the difference VA−VM.

When the decision unit 4 has decided that the absolute value A is significant and the sign discriminator 5 has determined that the polarity of the difference is positive, a phase shifter controller 6 stores in the memory 3 the level VA of the detector 1 determined to be significant, and, at the same time, shifts (rotates) the phase shifter 10 by a predetermined phase amount in the same direction. On the other hand, when the sign discriminator 5 has determined that the polarity of the difference is negative, the controller 6 stores in the memory 3 the level of the detector 1 determined to be significant by the decision unit 4, and, at the same time, shifts the phase shifter 10 by the predetermined phase amount in the opposite direction.

When the absolute value A is smaller (insignificant) than the reference value P, the controller 6 rotates (shifts) the phase shifter 10 by the predetermined phase amount after a predetermined period of time has elapsed.

FIG. 4 shows the phase control section 13 of FIG. 3 as implemented using a microcomputer circuit, as previously mentioned. As shown, the phase control section 13 of FIG. 3 is replaced with a detecting, computing and controlling circuit 13' which is constructed using a microcomputer.

Figure 5:
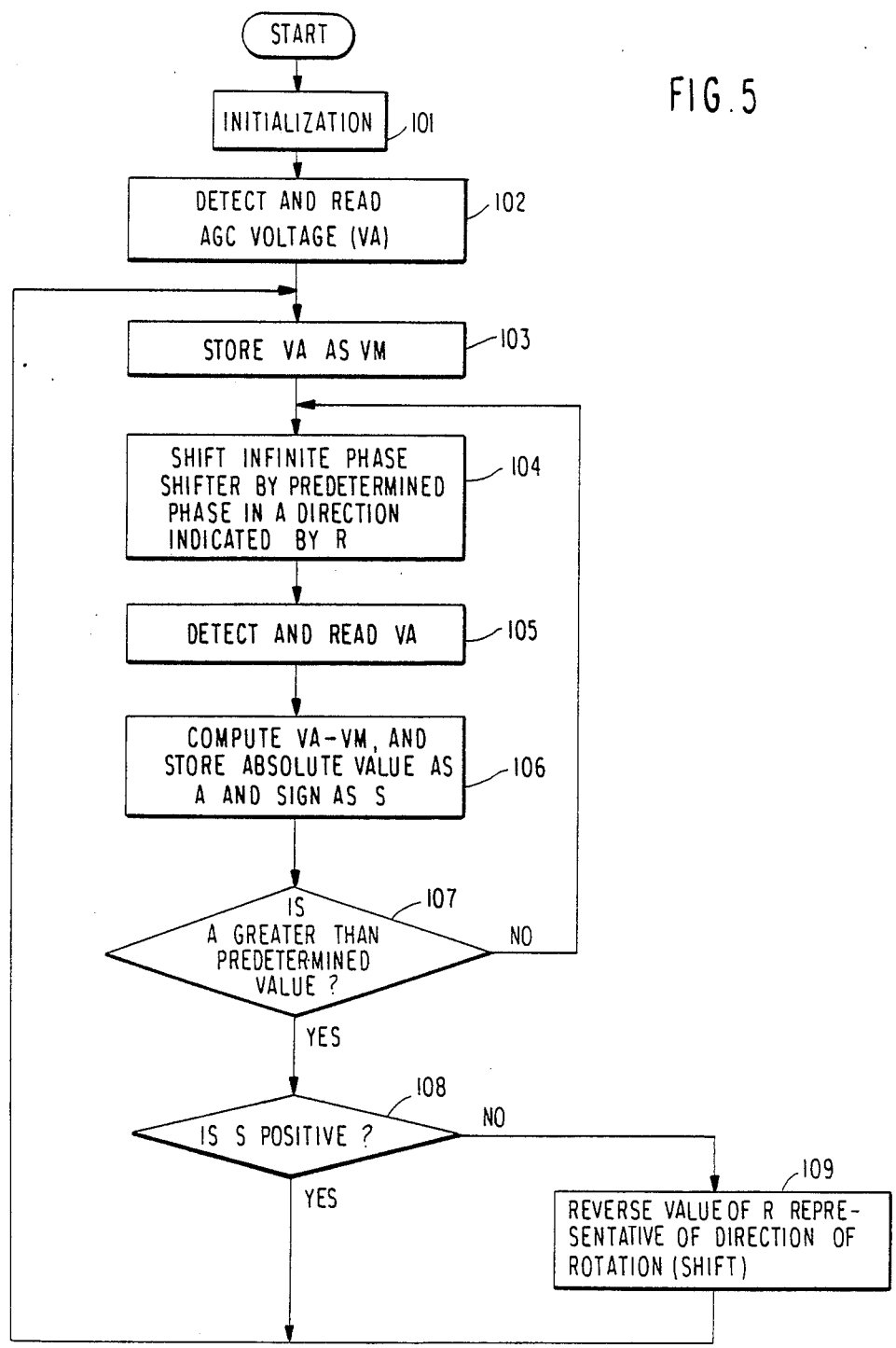
FIG. 5 is a flowchart demonstrating the operation of the circuit as shown in FIG. 4.

Referring to FIG. 5, there is illustrated the operation of the circuit 13' as shown in FIG. 4. Upon the start of operation, the circuit 13' initializes the circuitry (STEP 101), then detects and reads an AGC voltage VA out of the IF amplifier 12 (STEP 102), and then stores the read out value VA as VM (STEP 103). Subsequently, the circuit 13' rotates the endless phase shifter 10 by the predetermined amount (STEP 104), then reads the AGC voltage VA again (STEP 105). The difference between the stored value VM and the value VA is then computed, and the absolute value A of the difference VA-VM and a signal S representative of the polarity of the difference are stored (STEP 106).

Next, the circuit 13' decides whether the absolute value A is greater than a predetermined reference value P (STEP 107). If not, the program returns to STEP 104 and the phase shifter 10 is shifted by another predetermined phase amount, followed by the same procedure as above. If A>P, the program advances to the following STEP 108 to decide whether the sign S is positive or negative. If it is positive, the circuit 13' returns to STEP 103; if it is negative, the circuit 13' reverses the value of R, which is representative of the direction of rotation, in order to reverse the direction of rotation (STEP 109) and, then, returns to STEP 103.

By repeating STEPS 103 to 109 as described above, it is possible to constantly control the phase shifter 10 to the vicinity of in-phase.

In summary, it will be seen that the present invention simplifies the circuit construction as compared to the prior art system and, thereby, contributes a great deal to reducing costs enhancing reliability.

What is claimed is:

1. An in-phase combination type diversity receiving system, comprising:
    a local oscillator;
    a first frequency converter for converting a first signal to a first IF signal using the output of said local oscillator;
    an endless phase shifter for adjusting a phase of the output of said local oscillator in response to a phase control signal;
    a second frequency converter for converting a second signal to a second IF signal using the output of said endless phase shifter;
    a combiner for combining said first and second IF signals;
    an automatic gain controlled IF amplifier for amplifying the output of said combiner;
    a level detector for detecting an AGC voltage of said IF amplifier;
    a memory for storing the output of said level detector;
    a comparator for comparing (1) an output of said level detector which appears when said endless phase shifter is rotated by a predetermined phase amount and (2) an output of said memory, which stores an output of said level detector which appeared before said adjustment of said endless phase shifter and, thereby, producing an absolute value and a polarity of a difference between said two outputs;
    a decision unit for determining whether said absolute value is greater than a predetermined value;
    a sign discriminator for, when said absolute value is greater than said predetermined value, discriminating the polarity of said difference; and
    a phase shifter controller constructed to, when said absolute value is not greater than said predetermined value, shift said endless phase shifter by a predetermined phase amount and, when said absolute value is greater than said predetermined value, store said output of said level detector in said memory and, based on the polarity determined by said sign discriminator, shift said endless phase shifter by said predetermined phase amount in a direction determined in response to the output of the sign discriminator, whereby said first and second signal are combined in the vicinity of in-phase.

2. A receiver system for receiving and combining in-phase signals, comprising:
    a local oscillator;
    a first frequency converter coupled to an output of said local oscillator for converting a first signal to a first IF signal;
    phase shifter means coupled to an output of said local oscillator for adjusting the phase of said output in response to a phase control signal;
    a second frequency converter coupled to an output of said phase shifter means for converting a second signal to a second IF signal;
    means for combining said first and second IF signals;
    amplifier means for amplifying the combined signal;
    means for producing said phase control signal, comprising;
    means for detecting and storing a gain control signal of said amplifier means,
    means for detecting a variance in the value of said gain control signal over time, and
    means responsive to the magnitude and direction of said variance to generate said phase control signal and to control the direction of shift of said phase shifter means.

3. A receiver system as claimed in claim 2, wherein said means for producing said phase control signal comprises a microcomputer.

4. A receiver system for receiving and combining in-phase signals, comprising;
    means for receiving at least two signals and for shifting the phase of at least one signal so as to render said signals at least approximately in-phase;
    means for combining said approximately in-phase signals;
    means for amplifying an output of said combining means, and control means responsive to a gain of said amplifier means for controlling the phase shift of said at least one signal,
    wherein said control means comprises:
    means for detecting and storing a gain control signal of said amplifier means,
    means for detecting a variance in the value of said gain control signal over time, and
    means responsive to the magnitude and direction of said variance to generate said phase control signal and to control the direction of shift of said phase shifter means.

5. A receiver system as claimed in claim 4, wherein said phase shifting means comprises an endless phase shifter.

6. A receiver system as claimed in claim 4, wherein said detecting and storing means comprises means for detecting a voltage level of said gain control signal, and memory means for storing a value corresponding to said voltage level.

7. A receiver system as claimed in claim 6, wherein said variance detecting means comprises comparator means for comparing a presently detected gain control signal voltage level with a first value stored in said memory representative of a previously detected gain control signal voltage level, to produce a difference output.

8. A receiver system as claimed in claim 7, further including decision circuit means responsive to said comparator means for comparing said difference output with a predetermined value.

9. A receiver system as claimed in claim 8, further including sign discriminating means operable to detect the sign of said difference output in response to an output of said decision circuit means indicating that said difference output exceeds said predetermined value.

10. A receiver system as claimed in claim 9, further including phase shifter controller means for varying the phase shift of said phase shifting means by a predetermined shift amount, and in a direction determined by the output of said sign discriminating means.

11. A receiver system as claimed in claim 10, wherein said phase shifter controller means operates to cause said memory to update said first value by storing said presently detected gain control signal voltage level as said first value.

* * * * *

UNITED STATES PATENT AND TRADEMARK OFFICE
CERTIFICATE OF CORRECTION

PATENT NO. : 4,752,941

DATED : June 21, 1988

INVENTOR(S) : TAKAHARA ET AL

It is certified that error appears in the above-identified patent and that said Letters Patent is hereby corrected as shown below:

Column 4, line 2, after "a" insert --phase shifter--;
Column 5, line 23, after "costs" insert --and--.

Signed and Sealed this

Thirteenth Day of December, 1988

Attest:

DONALD J. QUIGG

*Attesting Officer*     *Commissioner of Patents and Trademarks*